SHERMAN & MASON.
Hand Seeder.
No. 16,314
Patented Dec. 23, 1856.
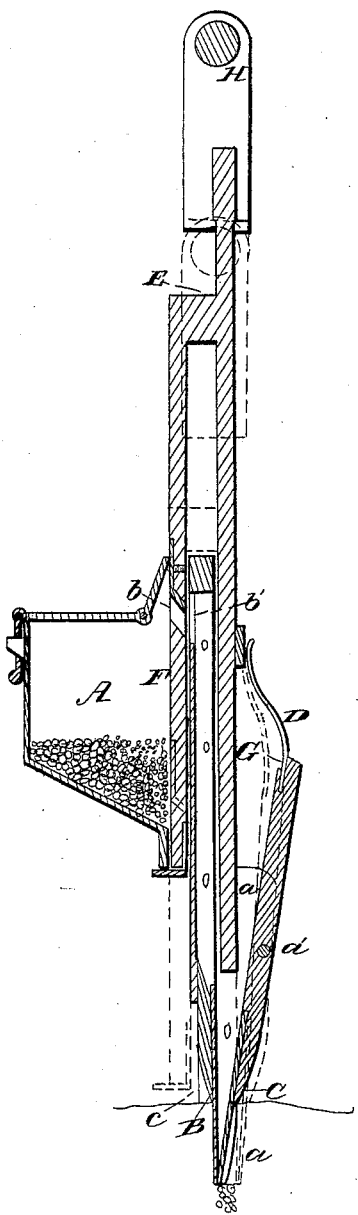

UNITED STATES PATENT OFFICE.

N. C. SHERMAN AND J. MASON, OF HAZEL GREEN, WISCONSIN.

IMPROVEMENT IN SEED-PLANTERS.

Specification forming part of Letters Patent No. 16,314, dated December 23, 1856.

*To all whom it may concern:*

Be it known that we, N. C. SHERMAN and J. MASON, of Hazel Green, in the county of Grant and State of Wisconsin, have invented a new and Improved Implement for Planting Corn and other Seed by Hand; and we do hereby declare that the following is a full, clear, and exact description of our invention, reference being had to the annexed drawing, making a part of this specification, said drawing being a vertical section of our improvement, the plane of section being through the center.

Our invention consists in providing a double plunger composed of two bars, which unite at their upper ends into one head or handle, but whose lower portions are separated, one of said bars being made to pass through a seed-box and lift a certain quantity of seed therefrom at each stroke, while the other bar serves to open certain jaws at the base of the implement for the escape of the seed, and also to press the seed gently into the ground, as hereinafter set forth.

To enable those skilled in the art to fully understand and construct our invention, we will proceed to describe it.

A represents a hopper, which may be constructed of wood or sheet metal, of a suitable size, and having a jaw or plate, B, attached to its lower end, said jaw or plate having a flange, $a$, at each end, so as to form a three-sided box.

C represents a movable or vibrating jaw, which may be formed of a metal plate attached to a wooden shank, the shank being pivoted between the flanges $a$ at $a'$, and having a spring, D, bearing against its upper end, said spring, when not acted upon or overcome by any extraneous power, keeping the lower end of the jaw C against the lower end of the stationary jaw B, the jaw C being a trifle shorter than the jaw B.

E represents a plunger, which is formed of two flat bars, F G, one of which, F, passes through the hopper A, and the other, G, works between the two jaws B C. The bar G, when the plunger is forced downward to its fullest extent, has its lower end flush with the ends of the jaws B C or extending a trifle beyond them. Through the bar F of the hopper an oblique opening, $b$, is made, as plainly shown in the drawing, and the bar F works closely against the side of the hopper. An opening, $b'$, is also made through the inner side of the hopper A. The aperture $b$, in consequence of its obliquity, forms a pocket for containing the seed, so that when the bar F is pushed down, the pocket $b$ enters among the seed and is filled; and when the bar F rises, the seed contained in the pocket $b$ is drawn up above the mass of seed and falls down through aperture $b'$ to the mouth of the jaws B C, below the plunger-bar G, and is ready for discharge. By regulating the size of pocket $b$ a greater or less amount of seed may be deposited. To the stationary jaw B there is attached a horizontal bar, $c$, which serves as a gage. To the upper part of the plunger E a handle, H, is attached.

The operation will be readily seen. The hopper A is filled with seed, and the operator carries the implement in his hand and places it over the desired spot. When the plunger E is drawn upward the corn with which the opening $b$ is filled passes the opening $b'$ and falls down at the lower part of the jaws B C, which are closed by the spring D. The jaws are forced into the ground till the gage $c$ strikes the surface and arrests the further descent of the jaws. Plunger-bar G now comes down, and when it reaches that portion of the apex of the jaws B C where the latter are narrower than the bar G said bar comes in contact with jaw C, and causes it to turn on its pivot $a'$, and thus spreads open its lower extremity, which presses the earth aside, thus forming a pocket in the ground. The seed which had previously fallen to the apex of the jaws B C is, by the spreading of jaw C, permitted to fall down of its own gravity until it rests on the ground at the bottom of the pocket just formed, and there remains between the now open jaws until the plunger-bar G comes farther down and gently presses or embeds the seed into the earth which forms the bottom of the pocket. Owing to the extreme thinness of the machine, the jaws B C come together at their apex like a sharp wedge or knife, and therefore when they enter the ground they do not drive down before them any of the top or dry earth. By entering as a wedge, and then opening, the seed is always deposited upon moist ground, which insures its more rapid germination.

In a patent granted to C. A. Wakefield, 1854, for a hand corn-planter, the seed is carried from the seed-box to the discharging-jaws by means of a horizontal slide and brush operated through suitable connections by a plunger. In other machines a revolving wheel having seed pockets or cups on its periphery is employed for the same purpose.

It is obvious that our method of conveying the seed by means of a vertical bar is much the simplest, cheapest in construction, and least liable to get out of order. It does not require the use of brushes and is sure in its operations. Our method also permits the whole of the upper portion of the ordinary case or shell of the planter to be dispensed with, and allows the machine to be made quite thin, and therefore much lighter than any of the planters in which a plunger is used. Indeed, our machine only weighs about one-third as much as those contrivances that have the full-sized shell. Our machine also is light, compact, and easily operated and wielded in the hand, while others are comparatively heavy, clumsy, and wielded in the hand with difficulty.

In Wakefield's patent the jaws do not enter the ground like a wedge, but merely strike upon its surface and cause an indentation. The plunger then comes down, drives the seed through the jaws, and the plunger, also issuing through them, forces the seed farther down into the ground. This method is highly objectionable, because the seed is first embedded in the top on dry ground, and in that condition driven down, for the plunger carries a portion of the top earth with it by its descent. Seeds thus planted require a longer time to germinate than when deposited in the moist earth, as by our machine. Wakefield's patent is also objectionable, because the plunger is likely to drive out the grain with such force as to crush it. When the surface of the ground is moist the plunger also clogs up with mud and renders the machine inoperative. The reason of this is obvious. The plunger projects below the jaws, and the mud therefore adheres to its sides. In our machine no such objection can exist, as the plunger-bar G only descends to a line flush with the bottom of the jaws B C, and does not project through them.

We distinctly disclaim the wedge-shaped jaws, to be opened after having been thrust into the ground, thus forming a pocket or cavity into which the seed may fall. Devices of this kind are old, and an example is seen in Hughes' patent, November, 1855.

What we claim as our invention, and desire to secure by Letters Patent, is—

The double plunger E, having bars F G, operating and combined with the seed-box A and jaws B C, in the manner substantially as set forth.

N. C. SHERMAN.
J. MASON.

Witnesses:
WILLIAM MACLAY,
MATTHEW THOMPSON.